(12) United States Patent
Kim et al.

(10) Patent No.: US 11,781,691 B2
(45) Date of Patent: Oct. 10, 2023

(54) QUICK CONNECTOR

(71) Applicant: COAVIS, Sejong-si (KR)

(72) Inventors: Yu Mi Kim, Cheongju-si (KR); Ku Sung Kwon, Daejeon (KR)

(73) Assignee: COAVIS, Sejong-si (KR)

( * ) Notice: Subject to any disclaimer, the term of this patent is extended or adjusted under 35 U.S.C. 154(b) by 0 days.

(21) Appl. No.: 17/651,516

(22) Filed: Feb. 17, 2022

(65) Prior Publication Data

US 2022/0260190 A1 Aug. 18, 2022

(30) Foreign Application Priority Data

Feb. 18, 2021 (KR) .................. 10-2021-0021832
May 14, 2021 (KR) .................. 10-2021-0062476

(51) Int. Cl.
*F16L 37/098* (2006.01)
(52) U.S. Cl.
CPC .............................. *F16L 37/0985* (2013.01)
(58) Field of Classification Search
CPC ... F16L 37/0847; F16L 37/096; F16L 37/098; F16L 37/0985; F16L 37/1205; F16L 37/121; F16L 37/127; F16L 37/133; F16L 37/20
See application file for complete search history.

(56) References Cited

U.S. PATENT DOCUMENTS 593,191 A * 11/1897 Bernhardt ........... F16L 27/0812
285/280

FOREIGN PATENT DOCUMENTS

KR          101714313 B1     3/2017
KR         20180043975 A     5/2018

OTHER PUBLICATIONS

Korean Intellectual Property Office, Office Action Issued in Application No. 10-2021-0062476, dated Feb. 20, 2023, 8 pages.

* cited by examiner

*Primary Examiner* — Aaron M Dunwoody
(74) *Attorney, Agent, or Firm* — McCoy Russell LLP (57) ABSTRACT

A quick connector includes a housing having an insertion recess and a communication hole communicating with the insertion recess and formed in a direction perpendicular to the insertion recess, and a first fixing part having an arrest portion and an insertion guide protruding from the arrest portion in a direction toward an entrance of the insertion recess, wherein the arrest portion is inserted into the communication hole so that a lower end of the arrest portion is disposed in a position corresponding to the insertion recess, the first fixing part being coupled to the housing, so that the quick connector may be applied to a low-pressure side line in a fuel supply line of a vehicle, and since the quick connector has a simple structure, the quick connector may be easily manufactured and may be easily coupled and separated.

12 Claims, 8 Drawing Sheets

QUICK CONNECTOR

CROSS-REFERENCE TO RELATED APPLICATIONS

The present application claims priority to Korean Patent Application No. 10-2021-0021832 filed on Feb. 18, 2021, and to Korean Patent Application No. 10-2021-0062476 filed on May 14, 2021. The entire contents of the above-listed applications are hereby incorporated by reference for all purposes.

TECHNICAL FIELD

The following disclosure relates to a quick connector capable of easily connecting a fuel line so that components constituting a fuel supply system of a vehicle communicate with each other.

BACKGROUND

In general, a device such as a vehicle driven upon receiving liquid fuel with components such as a gasoline engine or a diesel engine includes a fuel tank storing fuel, a fuel pump module is installed in the fuel tank, and the fuel pump module is connected to an engine by a fuel supply line, so that fuel stored in the fuel tank may be supplied to the engine. In addition, a fuel supply system of the vehicle includes various parts such as filters and valves, and each part is connected using a hose and a quick connector.

Here, the fuel supply line may be classified into a high-pressure line having a relatively high pressure of flowing fuel and a low-pressure line having a low pressure.

However, in a related art, a quick connector having a complicated structure is used to prevent fuel leakage not only in the high-pressure line but also in the low-pressure line. Accordingly, a superfluous design is applied to the low-voltage line, which increases manufacturing cost, and a size of the quick connector is relatively large, making it difficult to form a compact configuration.

RELATED ART DOCUMENT

Patent Document

KR 2018-0043975 A (2018.05.02)

DISCLOSURE

Technical Problem

An embodiment of the present disclosure has been devised to solve the aforementioned problems, and an object of the present disclosure is directed to providing a quick connector which may be applied to a low-pressure line in a fuel supply line of a vehicle, has a simple structure so as to be easily manufactured, and is easily coupled and separated.

Technical Solution

In one general aspect, a quick connector includes: a housing having an insertion recess formed on one side thereof, into which a male connector is inserted, and a communication hole communicating with the insertion recess and formed in a direction perpendicular to the insertion recess; and a first fixing part having an arrest portion and an insertion guide protruding from the arrest portion in a direction toward an entrance of the insertion recess, wherein the arrest portion is inserted into the communication hole so that a lower end of the arrest portion is disposed in a position corresponding to the insertion recess, the first fixing part being coupled to the housing.

Also, the first fixing part may be rotatably coupled to the housing or may be formed to be elastically deformable.

Also, the first fixing part may further include a lever extending from an upper end of the arrest portion in a direction opposite to a direction in which the insertion guide protrudes; and a coupling portion having one side connected to a portion in which the arrest portion and the lever are connected to each other and the other side disposed to be spaced apart from the lever and coupled to the housing.

Also, the housing may have a pair of coupling holes formed to be spaced apart from each other, and the coupling portion of the first fixing part may have a pair of arrest protrusions corresponding to the pair of coupling holes, so that the arrest protrusions are inserted and coupled to the coupling holes.

Also, the quick connector of the present disclosure may further include an elastic member interposed between the housing and the lever.

Also, the housing may have a fixing protrusion, and one end of the elastic member may be inserted and coupled to the fixing protrusion.

Also, a height of a portion of the fixing protrusion corresponding to a free end of the lever may be lower than a height of the other remaining portion of the fixing protrusion.

Also, an insertion guide of the first fixing portion may include a main guide and a pair of auxiliary guides disposed on both sides of the main guide in a circumferential direction and spaced apart from each other.

Also, the arrest portion of the first fixing part may have an arrest height gradually decreasing from the main guide toward the auxiliary guides.

Also, the quick connector of the present disclosure may have a seating recess formed at the entrance of the insertion recess of the housing and having a diameter greater than a diameter of the insertion recess and the quick connector may further include an O-ring and a spacer inserted in the seating recess.

Also, an expansion portion may be provided in a form in which an inner diameter thereof gradually increases from the seating recess toward the entrance in a direction opposite to a direction in which a male connector is inserted, and a support rib corresponding to an inner diameter of the seating recess may protrude inward from a lower portion of the expansion portion in a radial direction.

Also, the quick connector of the present disclosure may further include a male connector having a step protruding from an outer circumferential surface thereof and inserted into the insertion recess of the housing to be caught by the arrest portion of the first fixing part to be coupled.

Also, the quick connector may further include a second fixing part extending toward the first fixing part from the communication hole of the housing and having a free end disposed at an upper side of the insertion guide.

Also, the housing may be formed such that both side walls of a portion of the housing corresponding to a free end of the lever are partially deleted.

Effect of Disclosure

The quick connector of the present disclosure may have a simple and reliable coupling structure and may be applied to a low-pressure side line having a relatively low pressure of fuel flowing from a fuel supply line of a vehicle to prevent fuel leakage.

Since the quick connector has a simple structure, the quick connector may be easily manufactured and manufacturing costs may be reduced.

In addition, since the quick connector is easily coupled and separated, the quick connector may be easily used even where a space in which a fuel line is arranged is narrow.

BEST MODE

Hereinafter, a quick connector of the present disclosure will be described in detail with reference to the accompanying drawings.

Example 1

Figure 1:
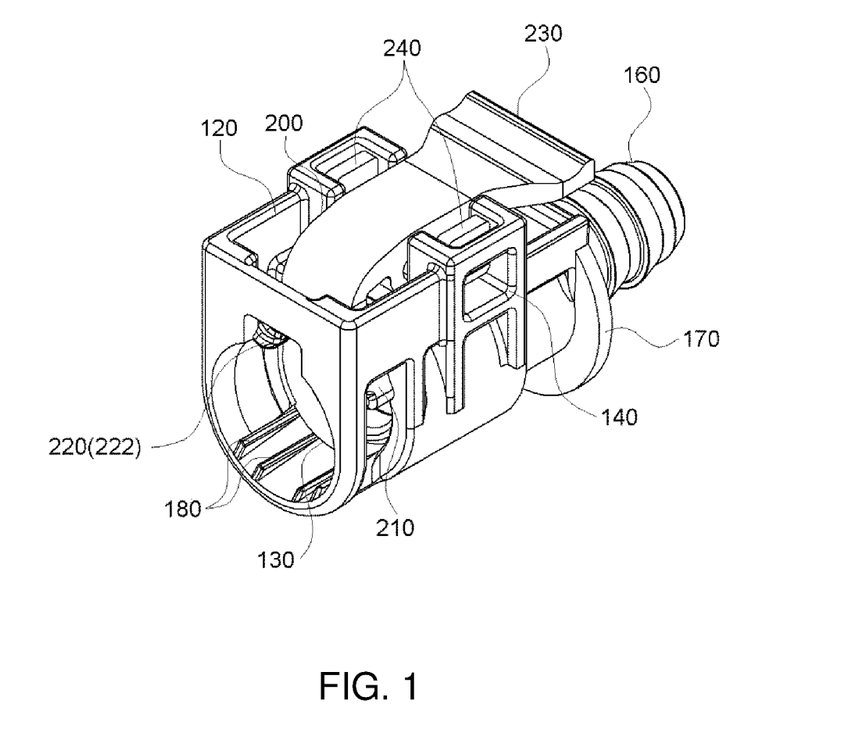
FIGS. 1 to 3 are an assembled perspective view, an exploded perspective view, and a front cross-sectional view showing a quick connector according to a first embodiment of the present disclosure.
Figure 2:
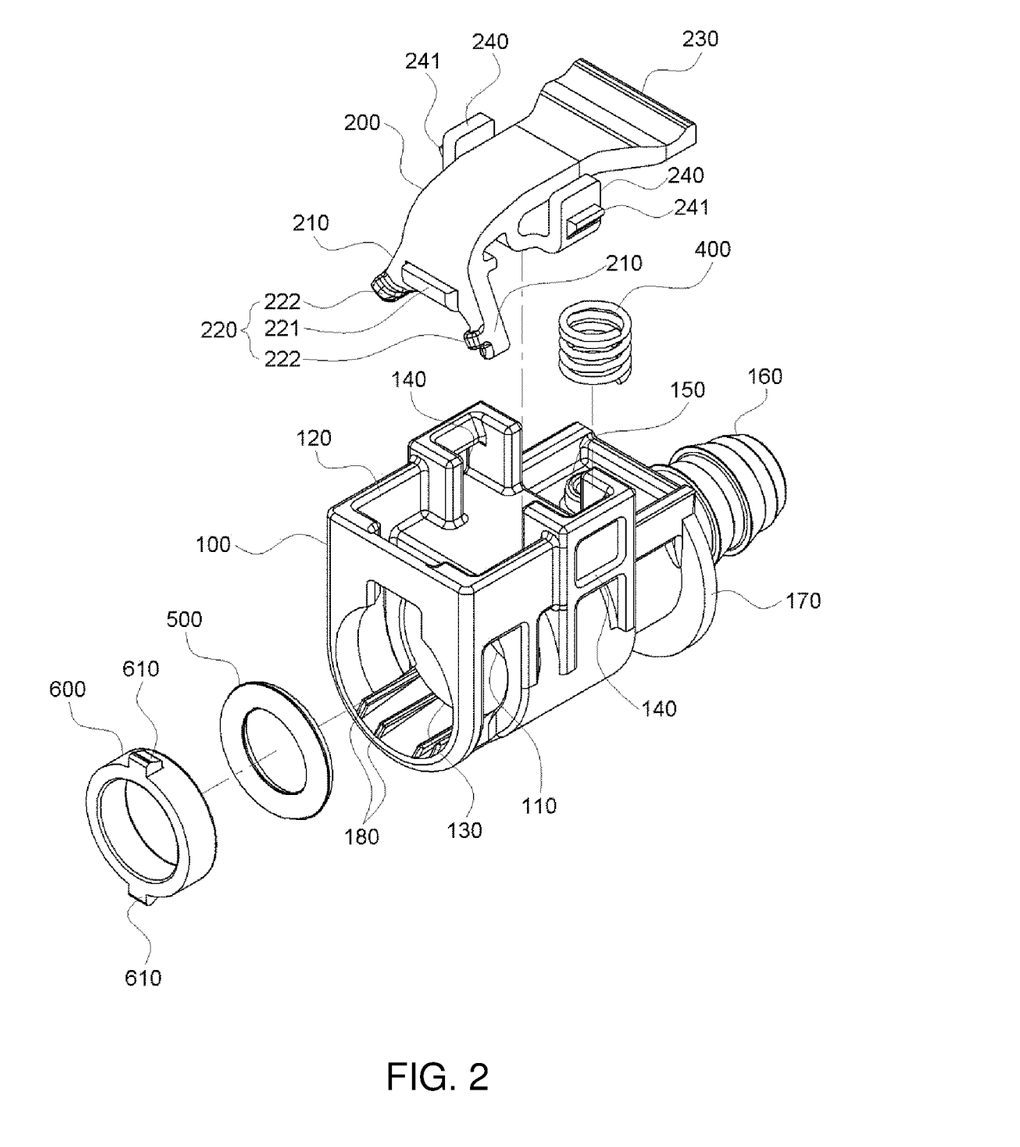
Figure 3:
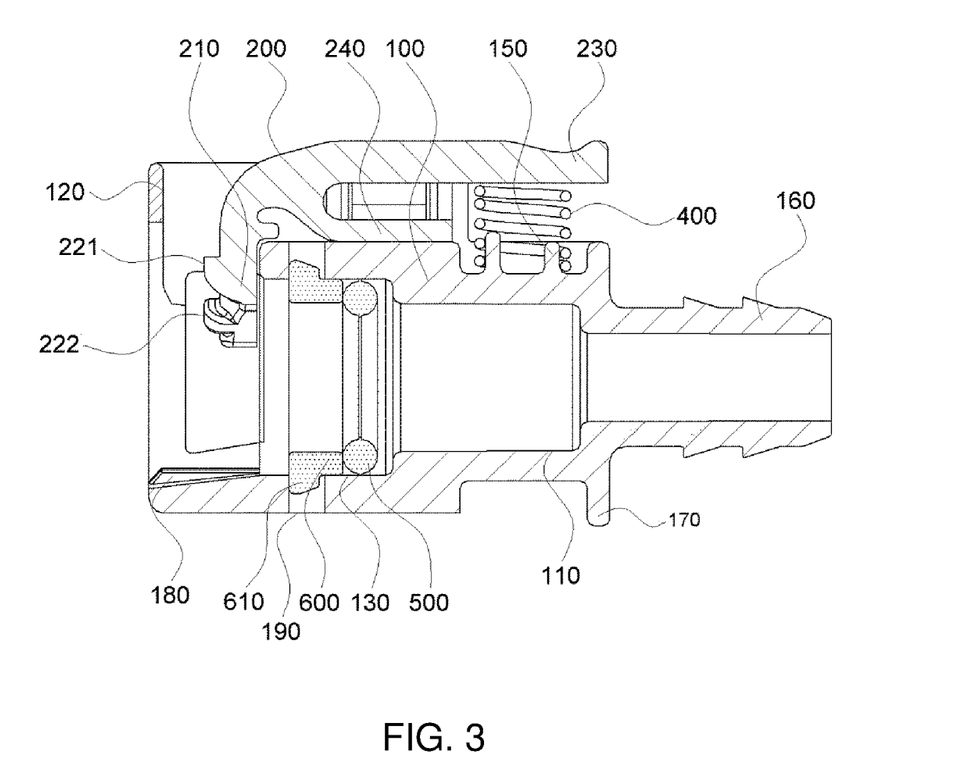
Figure 4:
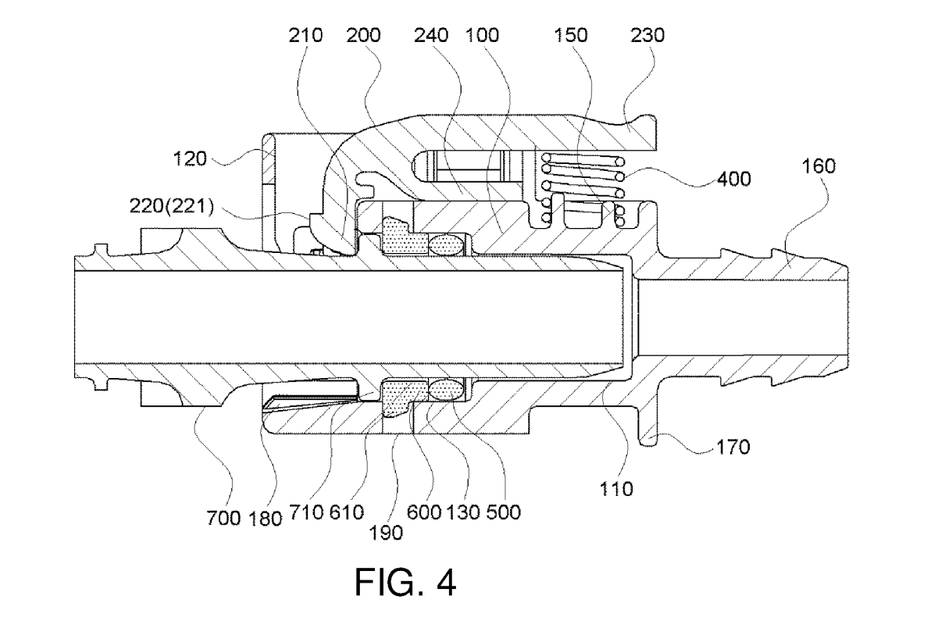
FIG. 4 is a front cross-sectional view showing a quick connector in a state in which a male connector is inserted and coupled according to the first embodiment of the present disclosure.

FIGS. 1 to 3 are an assembled perspective view, an exploded perspective view, and a front cross-sectional view showing a quick connector according to a first embodiment of the present disclosure, and FIG. 4 is a front cross-sectional view showing a quick connector in a state in which a male connector is inserted and coupled according to the first embodiment of the present disclosure.

As shown, the quick connector according to the first embodiment of the present disclosure may include a housing 100 and a first fixing part 200, and may further include an elastic member 400, an O-ring 500, a spacer 600, and a male connector 700.

In the housing 100, an insertion recess 110 may be formed to be concave on one side surface in a longitudinal direction in which the male connector 700 is inserted, and a connection port 160 may extend from the other side surface so that the insertion recess 110 and an internal flow path of the connection port 160 may communicate with each other. Also, a seating recess 130 having a diameter greater than a diameter of the insertion recess 110 may be formed in a partial region from a side surface adjacent to an entrance of the insertion recess 110 in the longitudinal direction, and the O-ring and the spacer 600 may be sequentially inserted into the seating recess 130. Also, a communication hole 120 may be formed to be concave downward from an upper surface in a height direction so that the communication hole 120 and the insertion recess 110 communicate with each other. Also, a coupling hole 140 may be formed to penetrate through both sides in a width direction on an upper side of the housing 100, and a fixing protrusion 150 protruding upward from an upper surface may be formed on an opposite side of the communication hole 120 with respect to the coupling hole 140 in the longitudinal direction.

The first fixing part 200 may include an arrest portion 210 and an insertion guide 220 and may further include a lever 230 and a coupling portion 240. The arrest portion 210 may be inserted into the communication hole 120 from the top of the housing 100 to the lower side so that the arrest portion 210 may be disposed in the communication hole 120. In addition, a lower end of the arrest portion 210 may be located at a height corresponding to an upper end of the insertion recess 110 in the height direction. In addition, the insertion guide 220 may extend from a lower end of the arrest portion 210 toward the entrance side of the insertion recess 110. Thus, the insertion guide 220 may protrude from one side surface of the arrest portion 210. At this time, a lower end portion of the insertion guide 220 may be formed in an upwardly inclined shape toward the entrance of the insertion recess 110 or a round shape, so that the male connector 700 may be easily inserted into the insertion recess 110. The lever 230 may be formed to extend from the upper end portion of the arrest portion 210 in a direction opposite to the entrance side of the insertion recess 110. The coupling portion 240 may be formed in such a shape that one side thereof is connected to a portion in which the arrest portion 210 and the lever 230 are connected and the other side thereof is spaced apart from the lever 230, so that the coupling portion 240 is attached to the housing 100. Also, the coupling portion 240 may be formed in various shapes and coupled to the housing 100, and as an example, as illustrated, in the coupling portion 240, vertical portions may extend in an upward direction from both sides of a horizontal portion disposed to be spaced apart from the lever 230 side by side in a width direction, and the vertical portions may be disposed to be spaced apart from the lever 230 in the width direction. Also, arrest protrusions 241 may protrude from an outer side of the vertical portions of the coupling portion 240 in the width direction so that the arrest protrusions 241 may be inserted and coupled to the coupling hole 140 of the housing 140. Partitions may be formed so that the coupling portions 240 may be inserted in a portion of the housing 100 in which the coupling hole 140 is formed, so that the coupling portion 240 may be inserted into an inner side surrounded by the partitions and may not be released in the longitudinal direction. Also, a lower surface of the horizontal portion of the coupling portion 240 may be in contact with and supported by an upper surface of the housing.

Thus, when the lever 230 is pressed, the coupling portion 240 may be elastically deformed, the first fixing part 200 may rotate based on the coupling portion 240, and the arrest portion 210 may move in an upward direction, and in this case, as the insertion guide 220 pushes the second fixing part 300 up, the second fixing part 300 may be elastically deformed. Also, when the lever 230 is released, the arrest portion 210 may be moved in a downward direction to be returned to its original position by elasticity.

The elastic member 400 may be, for example, a compression coil spring, a lower end of the elastic member 400 may be fitted into the fixing protrusion 150 of the housing 100 and an upper end of the elastic member 400 may be in contact with the lower surface of the lever 230. Thus, the lever 230 of the first fixing part 200 may be elastically supported by the elastic member 400. In addition, in the fixing protrusion 150, a height of a portion corresponding to a free end of the lever 230 of the first fixing part 200 may be formed to be lower than a height of the other remaining portions. As an example, as illustrated, a right side of the fixing protrusion 150 may be formed to have a relatively low height, and thus may be formed to be stepped. Thus, when the lever 230 of the first fixing part 200 is pressed and rotated, the lever 230 may be pressed deeper so that the arrest portion 210 may be lifted higher, and accordingly, the male connector 700 may be easily released in a direction opposite to a direction in which the male connector 700 is inserted, in a state in which the lever 230 is pressed.

The O-ring 500 may be inserted into the seating recess 130 for maintaining fluid tightness when the male connector 700 is inserted into the insertion recess 110.

The spacer 600 serves to fix the O-ring 500 not to be separated and moved in the longitudinal direction. The spacer 600 may be disposed adjacent to the O-ring 500, and the spacer 600 may be disposed on a rear side of the O-ring 500 in a direction in which the male connector 700 is inserted. In addition, the spacer 600 has arrest protrusions 610 protruding from both upper and lower portions thereof, and fixing holes 190 corresponding to the arrest protrusions 610 may be formed in the housing 100, so that when the spacer 600 is pushed into and press-fit into the seating recess 130, the arrest protrusions 610 may be inserted into the fixing hole 190 and the spacer 600 may be fixed in the seating recess 130 of the housing 100.

The male connector 700 may be formed in a tubular shape, and a step 710 may protrude from an outer circumferential surface in a ring shape. Accordingly, as shown in FIG. 4, when the male connector 700 is inserted into an end of the insertion recess 110 of the housing 100, the step 710 of the male connector 700 may be caught by the arrest portion 210 and may not be easily released in a direction opposite to a direction in which the male connector 700 is inserted. Also, when the male connector 700 is inserted into the insertion recess 110 of the housing 100, if the male connector 700 is further pushed and inserted further inward in a state in which the step 710 of the male connector 700 is in contact with the insertion guide 220, the male connector 700 may be easily inserted as the step 710 may push the arrest portion 210 up. In addition, in the case of separating the male connector 700 in a state in which the male connector 700 is inserted in the insertion recess 110 and caught by the arrest portion 210, the lever 230 may be pressed downward so that the arrest portion 210 may be lifted up, and thereafter, the male connector 700 may be pulled down so as to be easily separated.

As described above, the quick connector of the present disclosure may have a simple and reliable coupling structure and may be applied to a low-pressure side line having a relatively low pressure of fuel flowing from a fuel supply line of a vehicle to prevent fuel leakage. Also, since the quick connector has a simple structure, the quick connector may be easily manufactured and may reduce manufacturing costs, and since the quick connector is easily coupled and separated, the quick connector may be easily used even where a space in which a fuel line is arranged is narrow.

Figure 5:
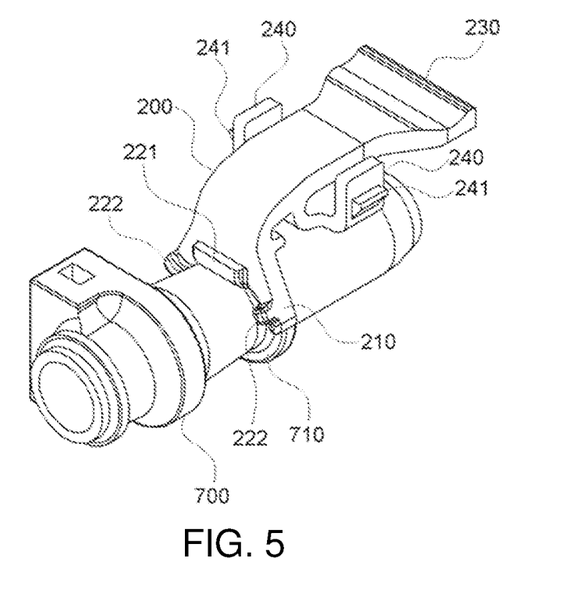
FIG. 5 is a perspective view showing a state in which a male connector is caught on a first fixing part according to the first embodiment of the present disclosure.
Figure 6:
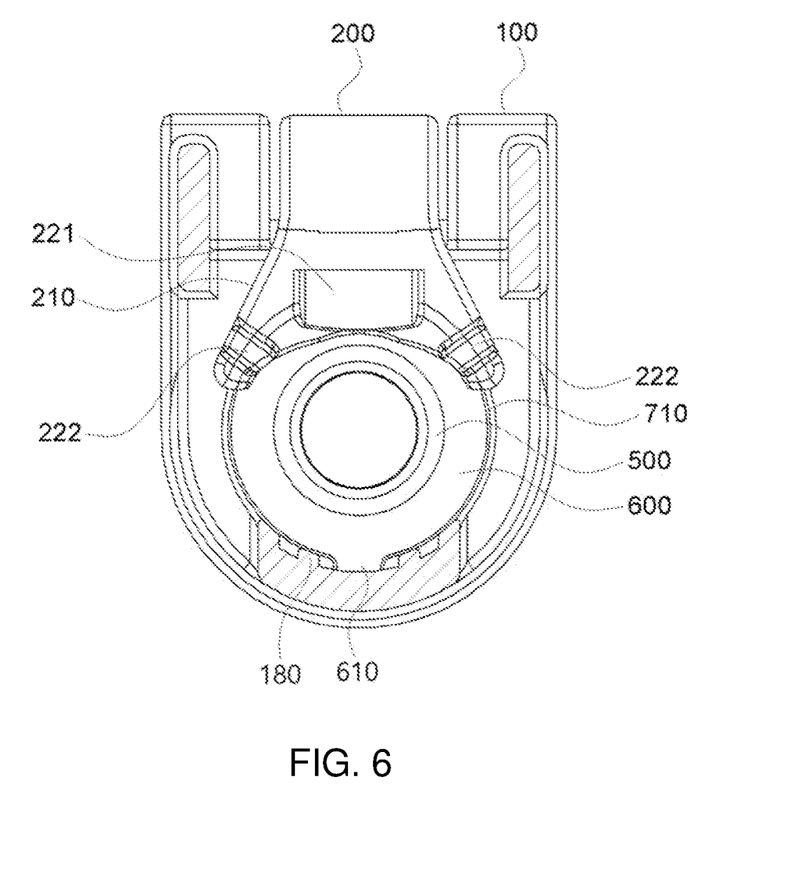
FIG. 6 is a left side view showing a quick connector according to the first embodiment of the present disclosure.
Figure 7:
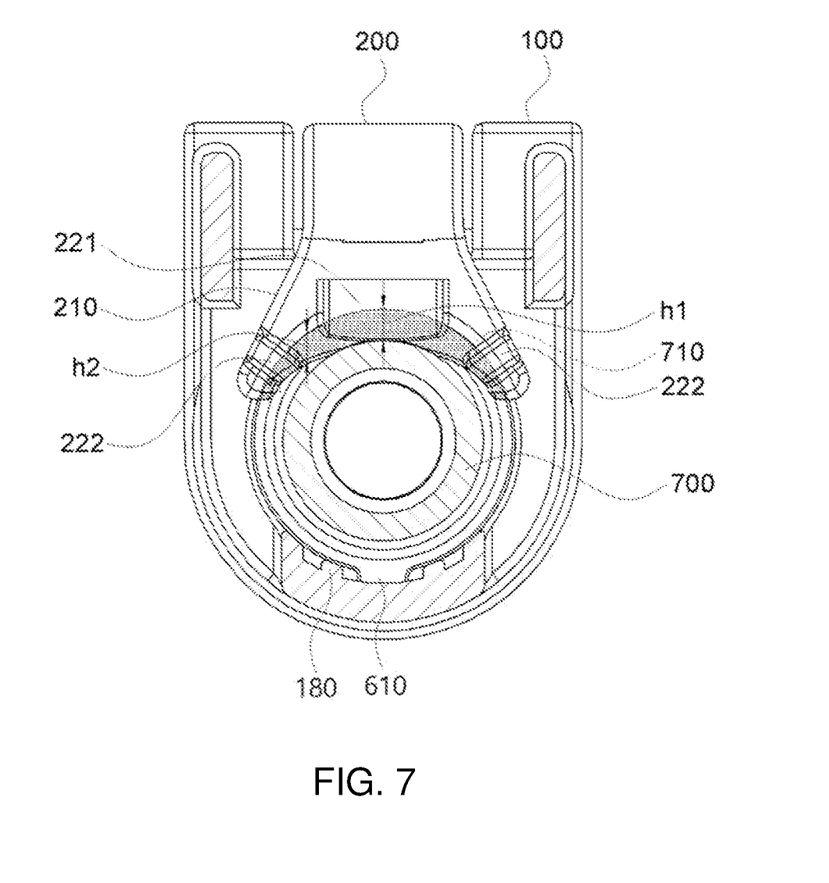
FIG. 7 is a left cross-sectional view showing a state in which a male connector is inserted and coupled according to the first embodiment of the present disclosure.

FIG. 5 is a perspective view showing a state in which a male connector is caught on a first fixing part according to the first embodiment of the present disclosure, FIG. 6 is a left side view showing a quick connector according to the first embodiment of the present disclosure, and FIG. 7 is a left cross-sectional view showing a state in which a male connector is inserted and coupled according to the first embodiment of the present disclosure.

Also, the insertion guide 220 of the first fixing part 200 may include a main guide 221 and a pair of auxiliary guides 222 formed on both sides of the main guide 221 in a circumferential direction and spaced apart from each other. That is, the main guide 221 may be formed in a central portion of the arrest portion 210 in the width direction, and the auxiliary guides 222 may be formed in positions spaced apart from the main guide 221 outward in the width direction. In addition, the auxiliary guides 222 may be disposed lower than the main guide 221 in a height direction. Therefore, when the male connector 700 is inserted into the insertion recess 110, the arrest portion 210 may be lifted in a more balanced manner, so that the male connector 700 may be easily inserted.

In addition, the hooking portion 210 of the first fixing part 200 may be formed to have a smaller arrest height from the main guide 221 side toward the auxiliary guide 222. That is, referring to a region in which the step 710 of the male connector 700 is caught by the arrest portion 210 as shown in FIG. 7, an arrest height h2 on the auxiliary guide 221 side is smaller than an arrest height h1 on the main guide 221 side. Therefore, when the male connector 700 is inserted into the insertion recess 110 to be coupled or removed and separated, a maximum height at which the arrest portion 210 is lifted upward may be as high as h1. Accordingly, the arrest height at which the arrest portion 210 is to be lifted may be reduced, compared to a case in which a diameter of an inner circumferential surface of a lower end of the arrest portion 210 is formed to correspond to an outer diameter of the male connector 700.

In addition, the housing 100 may have an expansion portion formed to have an inner diameter thereof gradually increasing from the seating recess 130 toward the entrance in a direction opposite to a direction in which the male connector 700 is inserted, so that the male connector 700 may be easily inserted into the insertion recess 110 and the seating recess 130 of the housing 100. At this time, a support rib 180 corresponding to the inner diameter of the seating recess 130 may be formed to protrude inward in a radial direction on a lower side of the expansion portion of the housing 100. Therefore, even if the male connector 700 is slightly pushed out in the direction opposite to the direction in which the male connector 700 is inserted due to external force or internal pressure, the male connector 700 may be prevented from sagging downward by the support rib 180, so that the male connector 700 may not be easily separated. That is, in a structure in which one first fixing part 200 holds and fixes the step 710 of the male connector 700 from only one side in a diameter direction, the support rib 180 may support the other side of the first fixing part 200 in the diameter direction to serve to supplement the prevention of separation of the male connector 700.

In addition, the housing 100 is formed in a form in which both sidewalls of a portion corresponding to the free end of the lever 230 are partially deleted, so that it is easy to press the lever 230. Accordingly, rigidity of the elastic member 400 may be increased so that the male connector 700 may not be easily released in an inserted state, and even if rigidity of the elastic member is relatively large, the male connector may be separated more easily by pressing the lever.

In addition, a flange 170 in a disk shape may be formed in the housing 100, and the flange 170 may be adjacent to a connection port 160 and formed at a position corresponding to the lever 230. Therefore, when the male connector 700 is pulled to be separated in the direction opposite to the direction in which the male connector 700 is inserted, an operator may easily hold and pull the flange portion 170 with his hands to easily remove the male connector 700.

Example 2

Figure 8:
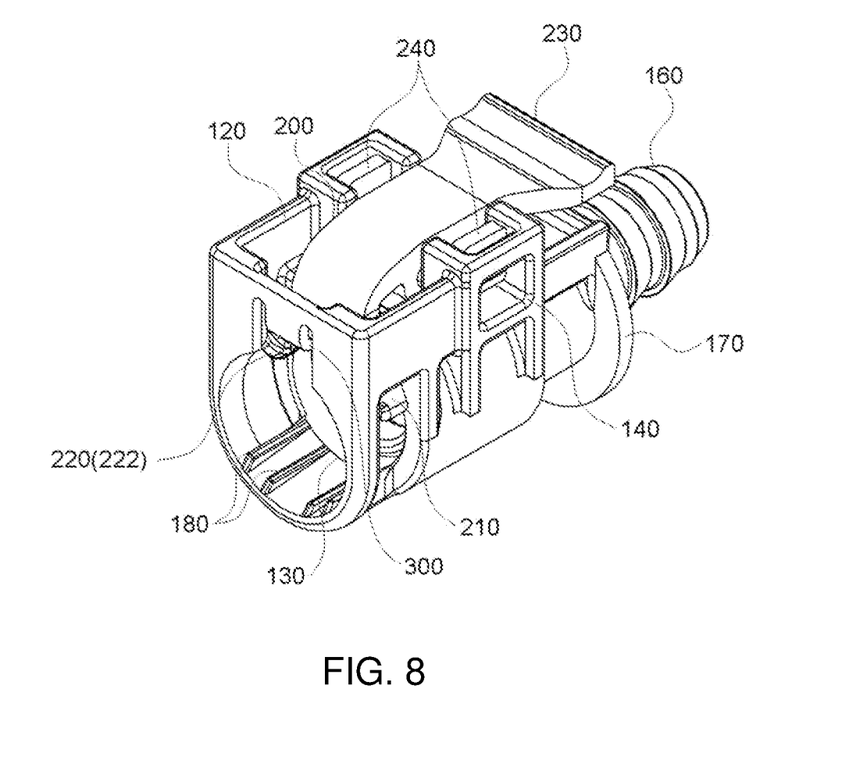
FIGS. 8 and 9 are an assembled perspective view and an exploded perspective view showing a quick connector according to a second embodiment of the present disclosure, and a front cross-sectional view showing a quick connector in a state in which a male connector is inserted and coupled.
Figure 9:
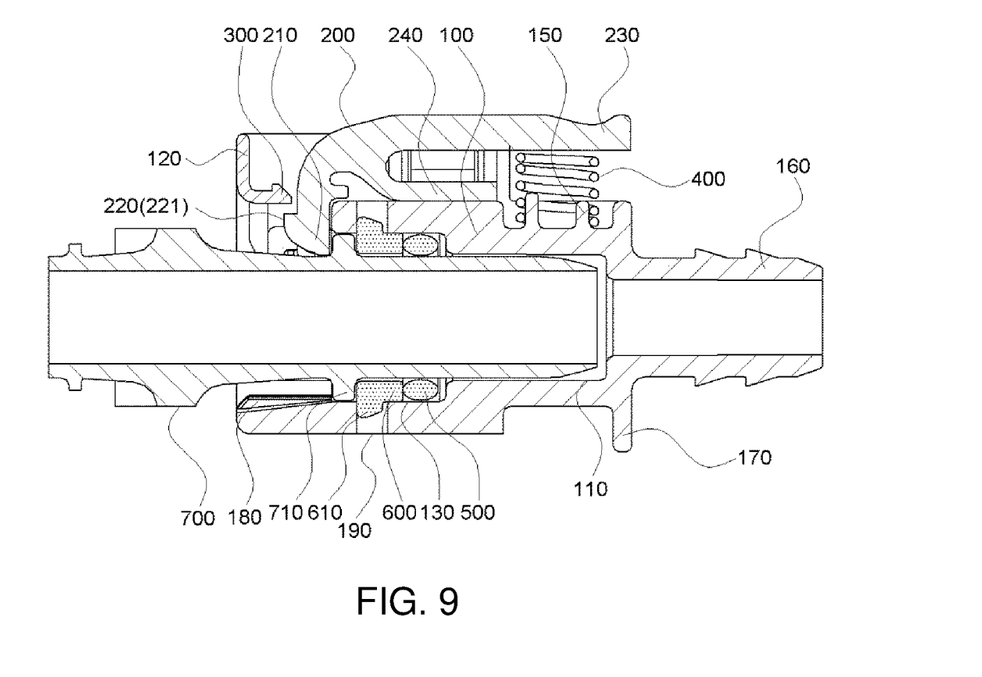

FIGS. 8 and 9 are an assembled perspective view and an exploded perspective view showing a quick connector according to a second embodiment of the present disclosure, and a front cross-sectional view showing a quick connector in a state in which a male connector is inserted and coupled.

As illustrated, the quick connector according to the second embodiment of the present disclosure may further include a second fixing part 300 in the first embodiment described above.

The second fixing part 300 may extend from the communication hole 120 of the housing 100 toward the arrest portion 210 of the first fixing part 200, and a free end of the second fixing part 300 may be disposed above the insertion guide 220. Accordingly, when the arrest portion 210 of the first fixing part 200 is inserted into the communication hole 120, the insertion guide 220 may be caught in the second fixing part 300 and may not be easily separated in an upward direction.

Accordingly, when the male connector 700 is pushed out in the direction opposite to the direction in which the male connector 700 is inserted due to external force or internal pressure, the arrest portion 210 side of the first fixing part 200 may be prevented from being deformed or rotated by the second fixing part 300, so that the male connector 700 may not be easily separated. In addition, in the case of separating the male connector 700 in a state in which the male connector 700 is inserted into the insertion recess 110 and caught by the arrest portion 210, when the lever 230 may be pressed downward, the arrest portion 210 may push the second fixing part 300 up and the second fixing part 300 may be deformed and the arrest portion 210 is lifted upward, and thereafter, the male connector 700 may be pulled down to be easily separated.

The present disclosure is not limited to the embodiments described above, and it will be understood by those skilled in the art that various modifications and variations may be made without departing from the scope of the disclosure.

DESCRIPTION OF REFERENCE NUMERALS

| | |
|---|---|
| 100: housing | 110: insertion recess |
| 120: communication hole | 130: seating recess |
| 140: coupling hole | 150: fixing protrusion |
| 160: connection port | 170: flange |
| 180: support rib | 190: fixing hole |
| 200: first fixing part | 210: arrest portion |
| 220: insertion guide | 221: main guide |
| 222: auxiliary guide | 230: lever |
| 240: coupling portion | 241: arrest protrusion |
| 300: second fixing part | |
| 400: elastic member | |
| 500: O-ring | |
| 600: spacer | 610: arrest protrusion |
| 700: male connector | 710: step |

The invention claimed is:

1. A quick connector comprising:
a housing having an insertion recess formed on one side thereof, into which a male connector is inserted, and a communication hole communicating with the insertion recess and formed in a direction perpendicular to the insertion recess;
a first fixing part having an arrest portion and an insertion guide protruding from the arrest portion in a direction toward an entrance of the insertion recess, wherein the arrest portion is inserted into the communication hole so that a lower end of the arrest portion is disposed in a position corresponding to the insertion recess, the first fixing part being coupled to the housing; and
an elastic member,
wherein the first fixing part is rotatably coupled to the housing or is formed to be elastically deformable;
wherein the first fixing part further includes:
  a lever extending from an upper end of the arrest portion in a direction opposite to a direction in which the insertion guide protrudes; and
  a coupling portion having one side connected to a portion in which the arrest portion and the lever are connected to each other and the other side disposed to be spaced apart from the lever and coupled to the housing;
wherein the elastic member is interposed between the housing and the lever; and
wherein the housing has a fixing protrusion, and one end of the elastic member is inserted and coupled to the fixing protrusion.

2. The quick connector of claim 1, wherein
the housing has a pair of coupling holes formed to be spaced apart from each other, and the coupling portion of the first fixing part has a pair of arrest protrusions corresponding to the pair of coupling holes,
so that the arrest protrusions are inserted and coupled to the coupling holes.

3. The quick connector of claim 1, wherein
a height of a portion of the fixing protrusion corresponding to a free end of the lever is lower than a height of the other remaining portion of the fixing protrusion.

4. The quick connector of claim 1, wherein
an insertion guide of the first fixing portion includes a main guide and a pair of auxiliary guides disposed on both sides of the main guide in a circumferential direction and spaced apart from each other.

5. The quick connector of claim 4, wherein
the arrest portion of the first fixing part has an arrest height gradually decreasing from the main guide toward the auxiliary guides.

6. The quick connector of claim 1, further comprising:
a seating recess formed at the entrance of the insertion recess of the housing and having a diameter greater than a diameter of the insertion recess, wherein the quick connector further includes an O-ring and a spacer inserted in the seating recess.

7. The quick connector of claim 6, wherein
an expansion portion is provided in a form in which an inner diameter thereof gradually increases from the seating recess toward the entrance in a direction opposite to a direction in which a male connector is inserted, and
a support rib corresponding to an inner diameter of the seating recess protrudes inward from a lower portion of the expansion portion in a radial direction.

8. The quick connector of claim 6, further comprising:
a male connector having a step protruding from an outer circumferential surface thereof and inserted into the insertion recess of the housing to be caught by the arrest portion of the first fixing part to be coupled.

9. The quick connector of claim 1, further comprising:
a second fixing part extending toward the first fixing part from the communication hole of the housing and having a free end disposed at an upper side of the insertion guide.

10. The quick connector of claim 1, wherein
the housing is formed such that both side walls of a portion of the housing corresponding to a free end of the lever are partially deleted.

11. A quick connector comprising:
a housing having an insertion recess formed on one side thereof, into which a male connector is inserted, and a communication hole communicating with the insertion recess and formed in a direction perpendicular to the insertion recess;
a first fixing part having an arrest portion and an insertion guide protruding from the arrest portion in a direction toward an entrance of the insertion recess, wherein the arrest portion is inserted into the communication hole so that a lower end of the arrest portion is disposed in a position corresponding to the insertion recess, the first fixing part being coupled to the housing; and
a seating recess formed at the entrance of the insertion recess of the housing and having a diameter greater than a diameter of the insertion recess,
wherein the quick connector further includes an O-ring and a spacer inserted in the seating recess.

12. A quick connector comprising:
a housing having an insertion recess formed on one side thereof, into which a male connector is inserted, and a communication hole communicating with the insertion recess and formed in a direction perpendicular to the insertion recess;
a first fixing part having an arrest portion and an insertion guide protruding from the arrest portion in a direction toward an entrance of the insertion recess, wherein the arrest portion is inserted into the communication hole so that a lower end of the arrest portion is disposed in a position corresponding to the insertion recess, the first fixing part being coupled to the housing; and
a second fixing part extending toward the first fixing part from the communication hole of the housing and having a free end disposed at an upper side of the insertion guide.

* * * * *